United States Patent
Kitawaki

(10) Patent No.: US 10,436,643 B1
(45) Date of Patent: Oct. 8, 2019

(54) SPECTROMETER AND RETAINER USED IN SAME

(71) Applicant: SHIMADZU CORPORATION, Nakagyo-Ku, Kyoto-Shi, Kyoto (JP)

(72) Inventor: Masaaki Kitawaki, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/146,372

(22) Filed: Sep. 28, 2018

(51) Int. Cl.
*G01J 3/28* (2006.01)
*G01J 3/18* (2006.01)
*G02B 5/18* (2006.01)
*G01J 3/02* (2006.01)

(52) U.S. Cl.
CPC ............... *G01J 3/18* (2013.01); *G01J 3/0291* (2013.01); *G02B 5/1861* (2013.01); *G01J 2003/1857* (2013.01)

(58) Field of Classification Search
CPC .... G01J 3/02; G01J 3/18; G01J 3/2803; G01J 3/2823; G01J 3/28
USPC ........................................................ 356/328
See application file for complete search history.

(56) References Cited

U.S. PATENT DOCUMENTS

| | | | |
|---|---|---|---|
| 2001/0035957 A1* | 11/2001 | Clermont ................. | G01J 3/02 356/451 |
| 2004/0036936 A1* | 2/2004 | Nakajima ............ | G02B 26/123 359/204.1 |
| 2005/0046850 A1* | 3/2005 | Chow ................ | G01B 11/0625 356/430 |
| 2005/0106038 A1* | 5/2005 | Yoon ................... | F04B 39/0061 417/312 |
| 2005/0121251 A1* | 6/2005 | Ueno ................... | B62D 5/0409 180/444 |
| 2006/0021958 A1* | 2/2006 | Wilson .................... | B66C 23/84 212/253 |
| 2009/0103081 A1* | 4/2009 | Whelan ..................... | G01J 3/28 356/243.1 |
| 2015/0276484 A1* | 10/2015 | Matsuzawa ............ | G01J 3/443 356/316 |

FOREIGN PATENT DOCUMENTS

| | | |
|---|---|---|
| JP | 2017-181159 | 10/1917 |
| JP | 2013-242280 | 12/2013 |

* cited by examiner

*Primary Examiner* — Md M Rahman
(74) *Attorney, Agent, or Firm* — Andrew F. Young, Esq.; Lackenbach Siegel, LLP

(57) ABSTRACT

A spectrometer includes a grating, a cylinder retainer and a housing. The grating comprises a grating surface having a concave toroidal form. The retainer comprises an end surface having a convex contact surface compatible with the grating surface, wherein the contact surface contacts with the grating surface. The housing includes an opening which the retainer fits in.

5 Claims, 5 Drawing Sheets

SPECTROMETER AND RETAINER USED IN SAME

CROSS REFERENCE TO RELATED APPLICATIONS

This application relates to, but does not claim priority from, JP Ser. No.: JP2016-065424 filed Mar. 29, 2016 and Published as JP Pub. No. 2017-181159 on Oct. 5, 2017, the entire contents of which are incorporated herein by reference.

FIGURE SELECTED FOR PUBLICATION

FIG. 1

BACKGROUND OF THE INVENTION

Field of the Invention

The present invention relates to a spectrometer comprising a diffraction grating having a concave toroidal diffraction grating surface and a retainer used therefor.

Description of the Related Art

As an example of a diffraction grating (grating), a reflective grating that has a concave grating surface and disperses (splits) each incident light to the light having different wavelength is known. A plurality of grooves that is extending in parallel to each other in a constant direction is formed on such a grating surface. As such a kind of grating, it is known that the grating surface thereof comprises a spherical form or a toroidal form (e.g., refer to Patent Document 1).

FIG. 4A is a schematic perspective view illustrating a (conventional) grating 100 having a spherical grating surface 101. With respect to the spherical grating surface 101, the curvature radii are constant relative to the axis along any direction within the grating surface 101. For example, with respect to the two axes A11, A12 that are orthogonal to each other on the grating surface 101, each curvature radius of the respective axes A11, A12 has the same value as one another.

FIG. 4B is a schematic perspective view illustrating a (conventional) grating 200 having a toroidal grating surface 201. With respect to the toroidal grating surface 201 that is different from the spherical grating surface 101 illustrated in FIG. 4A, the curvature radii are different in accordance with the axis direction on the grating surface 201. For example, with respect to the two axes A21, A22 that are orthogonal to each other on the grating surface 201, each curvature radius of the respective axes A21, A22 has different value from one another.

The diffraction gratings (gratings) 100, 200 are fixed to the predetermined location through e.g., cylinder retainers 103, 203. The respective end surfaces 131, 231 of the retainers 103, 203 are bonded to the grating surfaces 101, 201, so that the retainers 103, 203 are fixed thereon. The incident light into the grating surfaces 101, 201 is incident onto the grating surfaces 101, 201 through the retainers 103, 203 and reflected on the grating surfaces 101, 201, and the light dispersed by the reflection is guided to the detector through the retainers 103, 203.

Referring to FIG. 4A, given the grating surface 101 is spherical, the whole of the circular end surface 131 of the retainer 103 contacts with the grating surface 101, as a result, with respect to the grating 100, the whole of the end surface 131 of the retainer 103 contacts with the grating surface 101 regardless of the rotation angle of the retainer 103 relative to the axis-line L100 at the center thereof. Therefore, the end surface 131 of the retainer 103 is pressed down onto the grating surface 101 and fixed thereon by rotating the grating 100 around the axis-line L100 at the center thereof and then, adjusting the groove direction of the grating surface 101.

On the other hand, referring to FIG. 4B, given the grating surface 201 is spherical, the circular end surface 231 of the retainer 203 cannot contact with the grating surface 201 as a whole. Specifically, only two points of the end surface 231 of the retainer 203 contact with the grating surface 201, so that it is hard that such an end surface 231 is not fixed stably on the grating surface 201. As a result, the grating 200 is fixed as tilting to the retainer 203, so that the light may not be dispersed to provide the desired wavelength.

RELATED PRIOR ART DOCUMENTS PATENT DOCUMENT

Patent Document 1: JP Patent Published 2013-242280 A1

ASPECTS AND SUMMARY OF THE INVENTION

Objects to be Solved

Then, referring to FIG. 4B, the inventor comes up that given the grating surface 201 is spherical, the end surface 231 of the retainer 203 should have a convex contact surface that relates to the grating surface 201. Specifically, whereas making the end surface 231 of the retainer 203 to be a flat circle, undulation relating to the toroidal grating surface 201 can fix the end surface 231 stably on the grating surface 201.

However, according to such aspects, the grating 200 is not rotatable relative to the retainer 203 around the axis-line L200 at the center of the grating 200, so that it is different from the case referring to FIG. 4A, wherein the grating surface 101 is spherical. Therefore, it is infeasible that the end surface 231 of the retainer 203 is pressed down onto the grating surface 201 and fixed thereon by rotating the grating 200 around the axis-line L200 at the center thereof and then, adjusting the groove direction of the grating surface 201.

The present invention is completed considering such above circumstances and the purpose of the present invention is to provide a spectrometer and a retainer therefor that stably fix the grating and adjust the groove direction of the grating surface.

Means for Solving the Problem

A spectrometer of the present invention comprises a (diffraction) grating, a cylinder retainer and a housing. The grating comprises a grating surface having a concave toroidal form. The retainer comprises an end surface having a convex contact surface relating (fitting) the grating surface, wherein the convex contact surface contacts with the grating surface. The housing comprises an opening which the retainer fits in.

According to such aspects, the grating comprises then grating surface having the concave toroidal form and the retainer comprises the convex contact surface fitting to the grating surface at the end surface thereof, so that the contact surface is fixed so as to contact with the grating surface and the grating is stably fixed. In addition, the cylinder retainer fits in the opening of the housing, so that the groove direction of the grating surface can be adjusted just by rotating the retainer in the opening.

The four contact surfaces can be formed at every 90° interval from the center of the axis-line of the retainer.

In such aspects, the four contact surfaces formed at every 90° interval from the center of the axis-line of the retainer is fixed so as to contact with the grating surface, so that the grating does not tilt in any direction relative to the retainer and consequently, the grating is more stably fixed.

The grating surface may be a toroidal form in which the curvature radius at the first axis and the curvature radius of the second axis orthogonal to the first axis. In such a case, two of the four contact surfaces are formed on the first axis as sandwiching the axis-line and the other two thereof may be formed on the second axis as sandwiching the axis-line.

According to such aspects, the two contact surfaces on the first axis in the toroidal form of the grating surface as sandwiching the axis-line and the two contact surfaces on the second axis as sandwiching the axis-line. With respect to the grating surface having the toroidal form, the precision on the first axis and the second axis is higher than other areas, so that each contact surface contacts with the grating surface in such a high-precision area and as a result, the grating can be fixed more stably.

The retainer according to the aspect of the present invention is the retainer that is fixed to the grating comprising the grating surface having the concave toroidal form, is formed as a cylinder having the end surface of the convex contact surface having the form fitting to the grating surface, the contact surface is fixed so as to contact with the grating surface, and in addition, a ground-surface is formed on the outer circumference surface to hold the retainer rotatably.

According to such aspects, with respect to the grating surface having the concave toroidal form, the retainer that comprises the convex contact surface fitting to the grating surface at the end surface thereof is fixed in the state in which the contact surface thereof contacts with the grating surface, so that the grating is stably fixed. In addition, the retainer is held rotatably due to the ground surface formed on the outer circumference surface of the retainer, so that the groove direction of the grating surface can be adjusted just by rotating the retainer.

Effects of the Present Invention

According to the aspect of the present invention, the retainer is fixed so that the convex contact surface fitting to the grating surface contacts with the concave toroidal form relating to the grating surface, so that the grating is stably fixed. In addition, according to the aspect of the present invention, the groove direction of the grating surface can be adjusted just by rotating the retainer.

The above and other aspects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
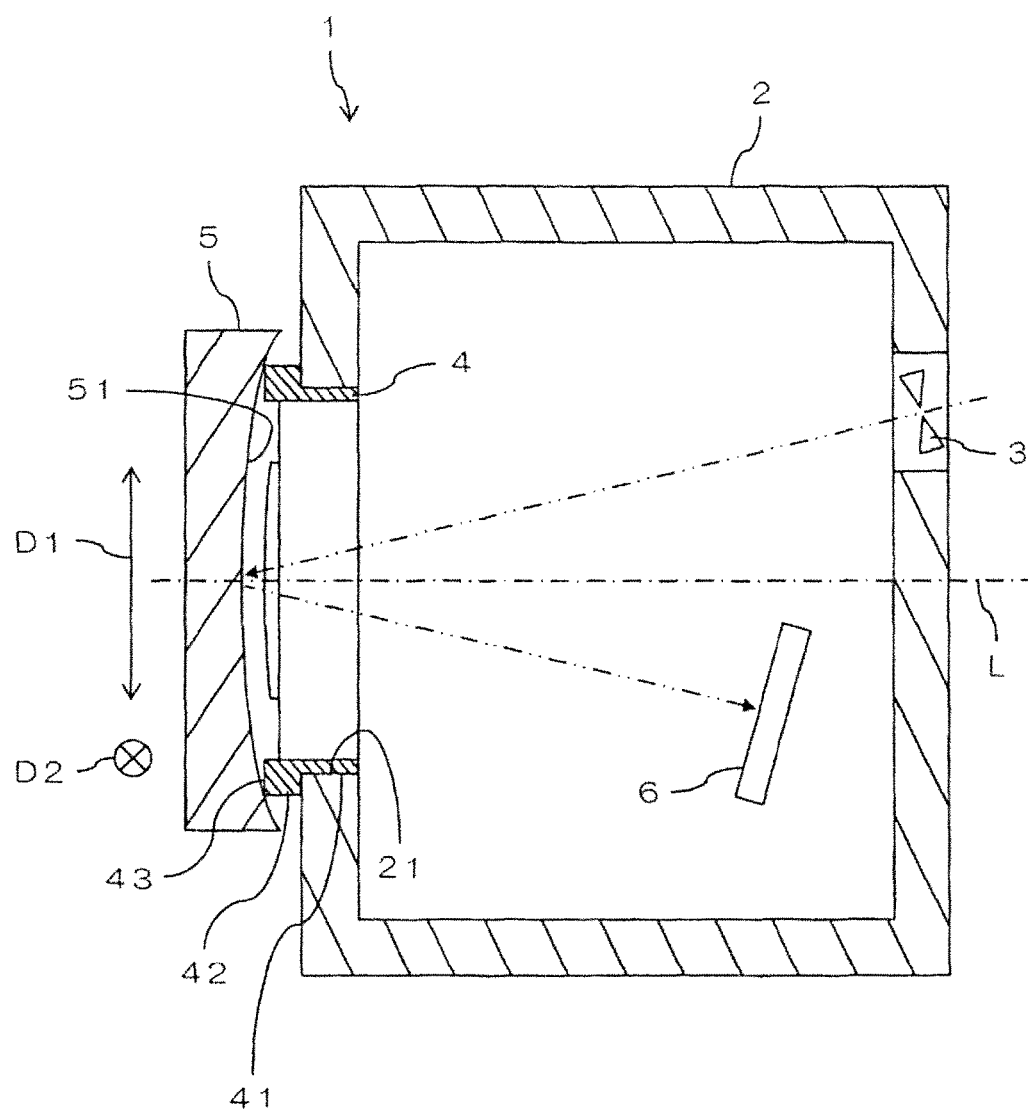
FIG. 1 is a schematic cross-section view illustrating an example of the structure of a spectrometer according to the aspect of the Embodiment 1 of the present invention.

Reference will now be made in detail to embodiments of the invention. Wherever possible, same or similar reference numerals are used in the drawings and the description to refer to the same or like parts or steps. The drawings are in simplified form and are not to precise scale. The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

Various operations may be described as multiple discrete operations in turn, in a manner that may be helpful in understanding embodiments of the present invention; however, the order of description should not be construed to imply that these operations are order dependent.

FIG. 1 is a schematic cross-section view illustrating an example of the structure of a spectrometer according to the aspect of the Embodiment 1 of the present invention. Such a spectrometer 1 is a polychromator comprising such as a housing 2, an incident slit 3, a retainer 4, a (diffraction) grating 5 and a detector 6, and in addition a variety of mirrors (not shown in FIG.).

The housing 2 is a hollow member blocking light and only the light passing through the incident slit 3 is incident into the inside thereof. The grating 5 is installed to the housing 2 from outside thereof through the retainer 4. In addition, the detector 6 is included inside the housing 2.

The retainer 4 is a cylinder member and is mounted to the opening 21 formed in the housing 2. The inner circumference of the opening 21 has the almost same size of bore (inner) diameter as the external diameter of the retainer 4. The external circumference surface of one end of the retainer 4 is a ground surface 41, and the retainer 4 rotates as the ground surface 41 contacts with the inner circumference surface of the opening 21, so that the retainer 4 is held rotatably.

A circular protuberance 42 that protrudes toward outside in the radial direction is formed on the external circumference surface at the other end of the retainer 4. When the retainer 4 is inserted into the opening 21, the protuberance 42 contacts with the circumference of the opening 21. Accordingly, the protuberance 42 functions as a stopper to restrain the retainer 4 entering into the housing 2.

The grating 5 comprises a concave grating surface 51. A plurality of grooves (not shown in FIG.) that is extending in parallel to each other in a constant direction is formed on the grating surface 51. The grating 5 is mounted to the retainer 4 as the grating surface 51 thereof faces the retainer 4. Each center axis-line of retainer 4 and the grating 5 locate on the same axis-line L.

The end surface in the protuberance 42 side of the retainer 4 is a contact surface 43 to contact with the grating surface

51. The grating 5 is fixed to the retainer 4 as the circumference of the grating surface 51 contacts with the contact surface 43, so that the central portion of the grating surface 51 faces the inside of the housing 2 through the inside of the retainer 4.

According to the aspect of the present Embodiment, the grating surface 51 of the grating 5 is toroidal. Specifically, with respect to the two axes orthogonal to each other on the grating surface 201, each curvature radius of the respective axes has different value from one another. For example, the D1 axis (first axis) from top to bottom passing the axis-line L on the grating surface 201 and the D2 axis (second axis) from right to left passing the axis-line L on the grating surface 201 are orthogonal to each other and each value of the curvature radius of each axis differs from one another.

The incident light into the housing 2 through the incident slit 3 passes the retainer 4 and is reflected from the grating surface 51 of the grating 5 following being paralleled by e.g., the collimating mirror (not shown in FIG.). Accordingly, the incident light is split to the lights wavelength-by-wavelength, and each wavelength light converged to the detector 6 by the focus mirror (not shown in FIG.).

The detector 6 comprises e.g., a photodiode array and outputs a signal in accordance with the light receiving intensity corresponding to each wavelength of the incident light from the grating 5. Accordingly, the data processor (not shown in FIG.) processes the output signal from the detector 6 and provides the spectral distribution of each wavelength.

Figure 2:
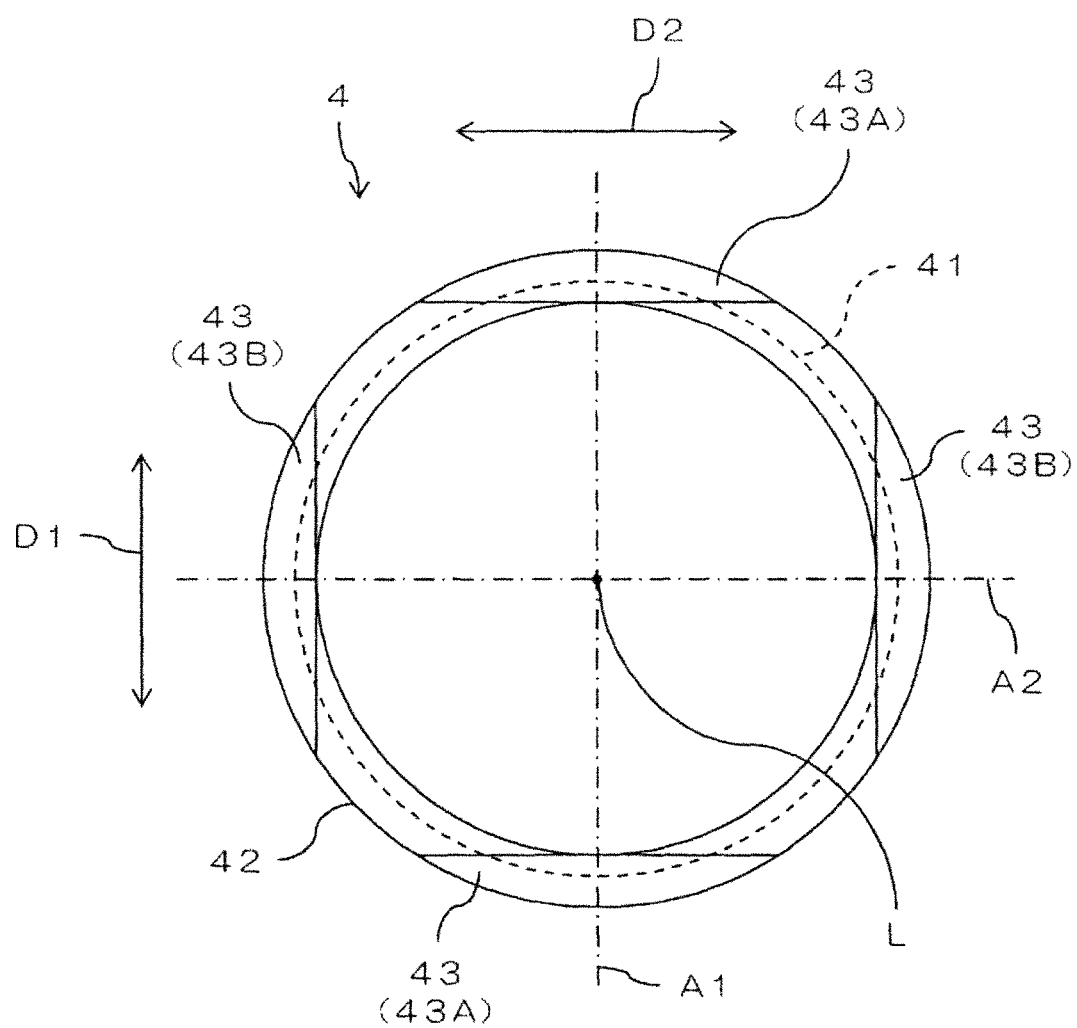
FIG. 2 is a schematic front view illustrating an example of the structure of a retainer.
Figure 3:
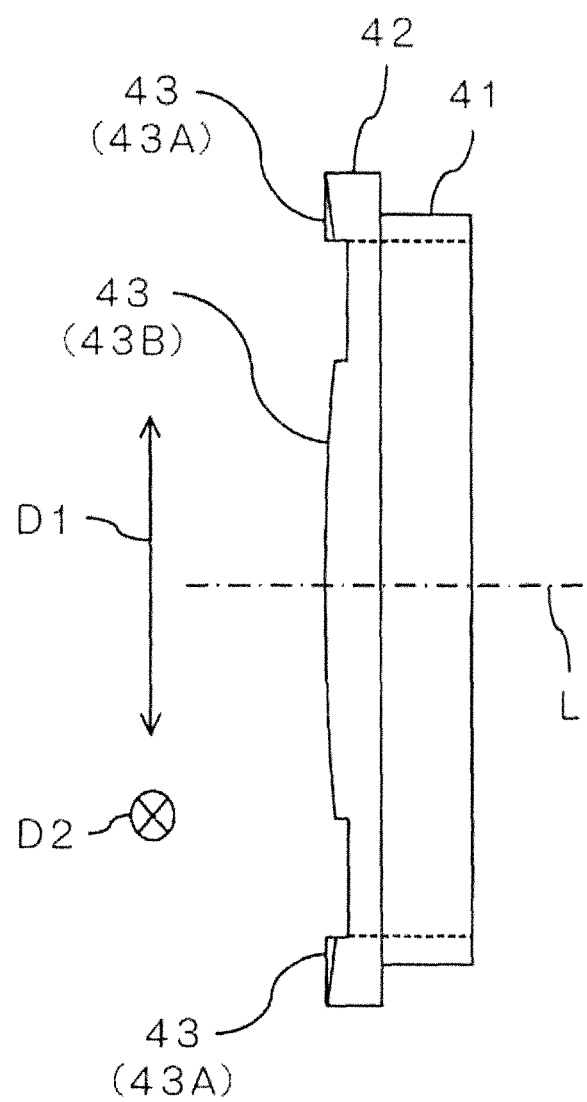
FIG. 3 is a schematic side view illustrating an example of the structure of the retainer.
Figure 4A:
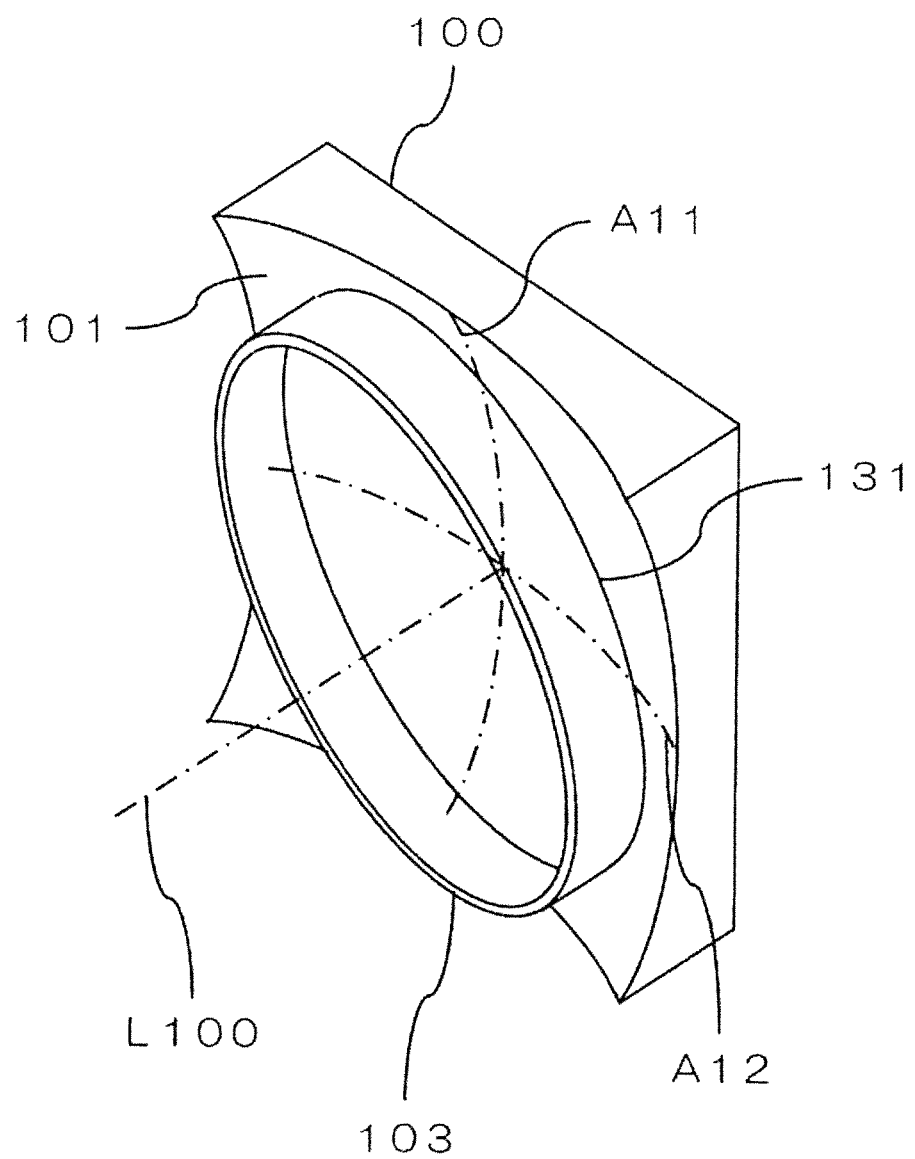
FIG. 4A is a schematic perspective view illustrating a grating having a spherical grating surface.
Figure 4B:
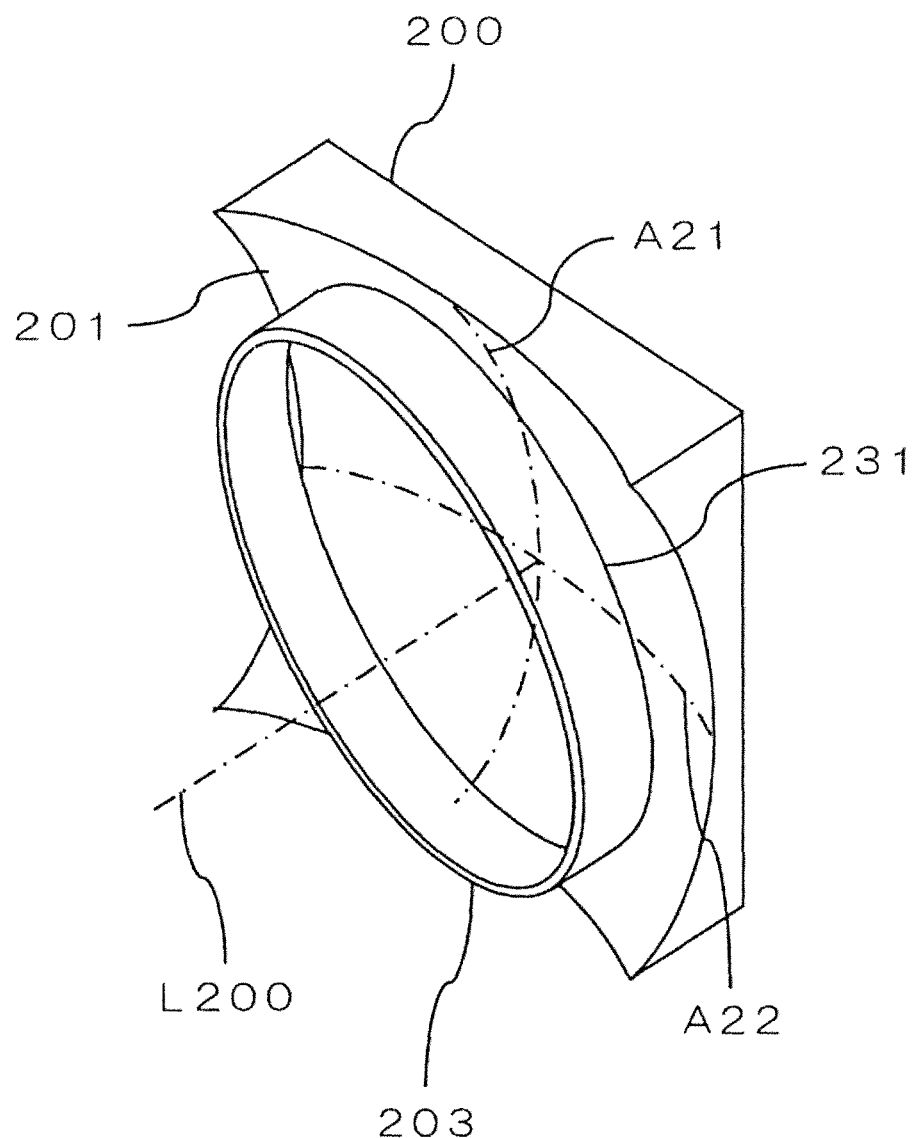
FIG. 4B is a schematic perspective view illustrating a grating having a toroidal grating surface.

FIG. 2 is a schematic front view illustrating the example of the structure of a retainer 4. FIG. 3 is a schematic side view illustrating the example of the structure of the retainer 4. Hereinafter, the inventor sets forth the specific aspects of the retainer 4 referring to FIG. 1-FIG. 3.

According to the aspect of the present Embodiment, the contact surface 43 is not formed on the entire end surface of the protuberance 42 side of the retainer 4, but a plurality thereof partially is formed relating to such an end surface. Specifically, the four contact surfaces 43 are formed at every 90° interval from the center of the axis-line L. Each contact surface 43 is not flat and forms a convex curved surface.

Each convex contact surface 43 comprises the form compatible with the grating surface 51 of the grating 5. Specifically, the A1 axis in the perpendicular (from top to bottom) direction D1 passing the axis-line L and the A2 axis in the width (horizontal) direction D2 passing the axis-line L are orthogonal to each other and each value of the curvature radius of each axis A1, A2 differs from one another.

The two contact surfaces 43 (first contact surfaces 43A) on the axis A1 are formed on the first axis of the grating surface 51 (on the perpendicular direction D1 passing the axis-line L) while sandwiching the axis-line L. The two first contact surfaces 43A are respectively extending in parallel to the axis A2 in the front view in FIG. 2. In addition, the two first contact surfaces 43A curved to form the convex along the direction parallel to the axis A2 and the curvature radius thereof is the same as the curvature radius of the second axis (axis in the width direction D2 passing the axis-line L) of the grating surface 201.

On the other hand, the two contact surfaces 43 (second contact surfaces 43B) on the axis A2 are formed on the second axis of the grating surface 51 (on the width direction D2 passing the axis-line L) while sandwiching the axis-line L. The two second contact surfaces 43B are respectively extending in parallel to the axis A1 in the front view in FIG. 2. In addition, the two second contact surfaces 43B curved to form the convex along the direction parallel to the axis A1 and the curvature radius thereof is the same as the curvature radius of the first axis (axis in the perpendicular direction D1 passing the axis-line L) of the grating surface 201.

The grating 5 is fixed to retainer 4 so that the four contact surfaces 43 (first contact surfaces 43A and second contact surfaces 43B) contact with the grating surface 51 as set forth above. Specifically, the protuberance 42 of the retainer 4 and the circumference of the grating 5 are bonded using such as an adhesive, so that the retainer 4 and the grating 5 are fixed on the same axis-line L so as not to rotate to one another.

In such a way, referring to FIG. 1, according to the aspect of the present Embodiment, the grating 5 comprises the grating surface 51 having the toroidal concave and the retainer 4 comprises the convex contact surface 43 compatible with the grating surface 51 at the end surface thereof. Accordingly, the contact surface 43 of the retainer 4 is fixed to contact with the grating surface 51, so that the grating 5 is stably fixed.

In addition, the cylinder retainer 4 fits in the opening 21 of the housing 2, so that the groove direction of the grating surface 51 is adjustable by rotating the retainer 4 in the opening 21. Further specifically, the retainer 4 is held rotatably due to the ground surface 41 formed on the outer circumference surface of the retainer 4, so that the groove direction of the grating surface 51 becomes adjustable just by rotating the retainer 4. The retainer 4 bonds with the housing 2 using such as an adhesive following adjusting the groove direction of the grating surface 51 by rotating the retainer 4 in the opening 21, so that the groove direction of the grating surface 51 is fixed.

Particularly, referring to FIG. 2, according to the aspect of the present Embodiment, the four contact surfaces 43 (first contact surfaces 43A and second contact surfaces 43B) are formed at every 90° interval from the center of the axis-line L. The four contact surfaces 43 are fixed so as to contact with the grating surface 51, so that the grating 5 hardly tilts in any direction relative to the retainer 4 and consequently, the grating 5 is more stably fixed.

In addition, according to the aspect of the present Embodiment, the two first contact surfaces 43A on the first axis (axis in the perpendicular direction D1 passing the axis-line L) in the toroidal form of the grating surface 51 as sandwiching the axis-line L and the two second contact surfaces 43B on the second axis (axis in the width direction D2 passing the axis-line L) are formed.

When forming the toroidal grating surface 51, the cutting of the surface of the grating 5 along the one direction of the first axis or the second axis is carried out and then the re-cutting of the surface of the grating 5 along the other axis is carried out. Therefore, the cutting precision on the first axis and the second axis trends higher than the cutting precision on the other area. Accordingly, according to the aspect of the present Embodiment, each contact surface 43 contacts with the grating surface 51 in the high-precision area (on the first axis and the second axis), so that the grating 5 is fixed more stably.

According to the aspect of the Embodiment set forth above, the inventor sets forth the aspect, wherein the four contact surfaces 43 are formed at every 90° interval from the center of the axis-line L. However, the present invention is not limited to such an aspect, the contact surface 43 can be at most 3 or at least 5. For example, when the entire end surface of the retainer 4 comprises the convex undulation compatible with the grating surface 51, it is feasible that the whole contact surface 43 contacts with the grating surface 51.

The aspect of the housing 2 is not limited to house the detector 6, but also houses other members. In addition, the retainer 4 can be inserted into the opening formed in the other member than the housing 2 and can be rotatable while sliding on the ground surface 41 relative to such an opening.

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art.

Those of skill would further appreciate that the various illustrative logical results having studied the disclosure. Skilled artisans may implement the described functionality in varying ways for each particular application, but such implementation decisions should not be interpreted as causing a departure from the scope of the exemplary embodiments.

Also, the inventors intend that only those claims which use the words "means for" are intended to be interpreted under 35 USC 112(f)/sixth paragraph only if used together (e.g., 'means' in combination with 'for') and therefore no presumption should be made to invoke 'means for' interpretation unless both words are used together in combination. Moreover, no limitations from the specification are intended to be read into any claims, unless those limitations are expressly included in the claims.

Having described at least one of the preferred embodiments of the present invention with reference to the accompanying drawings, it will be apparent to those skills that the invention is not limited to those precise embodiments, and that various modifications and variations can be made in the presently disclosed system without departing from the scope or spirit of the invention. Thus, it is intended that the present disclosure cover modifications and variations of this disclosure provided they come within the scope of the appended claims and their equivalents.

What is claimed is:

1. A spectrometer, comprising:
a housing having an incident slit permitting incident light therethrough into said housing;
a grating that comprises a grating surface having a concave toroidal form;
a cylinder retainer that comprises an end surface having a convex contact surface compatible with said grating surface;
said grating surface having a central portion facing an inside of said housing through an interior of said cylinder retainer;
a detector in said housing;
wherein said convex contact surface is fixed to contact with said grating surface;
said housing further comprises an opening in which said cylinder retainer fits; and
said retainer being rotatably fitted within said opening in said housing.

2. The spectrometer, according to claim 1, wherein:
said contact surface comprising four contact surfaces formed at every 90° interval from a center of an axis-line of said retainer.

3. The spectrometer, according to claim 2, wherein:
said grating surface has a toroidal form in which a curvature radius at a first axis and a curvature radius of a second axis orthogonal to the first axis differ from each other, and
a first two of said four contact surfaces on said first axis sandwich said axis-line and a second two of said four contact surfaces on the second axis sandwich said axis-line.

4. A retainer, for a spectrometer, comprising:
said retainer is fixed to a grating comprising a grating surface having a concave toroidal form and having a cylinder having an end surface having a convex contact surface that is compatible with a grating surface of the spectrometer at an end surface of the spectrometer said convex contact surface is fixed so as to contact with said grating surface, the spectrometer having a housing that is rotably coupled to the retainer, said convex contact surface comprises four contact surfaces formed at every 90° interval from a center of an axis-line of said cylinder, said grating surface having a toroidal form in which a curvature radius at a first axis and a curvature radius of a second axis orthogonal to the first axis differ from each other, a first two of said four contact surfaces on said first axis sandwich said axis-line and a second two of said four contact surfaces on the second axis sandwiching said axis-line.

5. A spectrometer, comprising:
a grating that comprises a grating surface having a concave toroidal form;
a cylinder retainer that comprises an end surface having a convex contact surface compatible with said grating surface;
wherein said convex contact surface is fixed to contact with said grating surface;
a housing that comprises an opening in which said retainer fits;
said contact surface comprising four contact surfaces formed at every 90° interval from a center of an axis-line of said retainer;
said grating surface has a toroidal form in which a curvature radius at a first axis and a curvature radius of a second axis orthogonal to the first axis differ from each other, and
a first two of said four contact surfaces on said first axis sandwich said axis-line and a second two of said four contact surfaces on the second axis sandwich said axis-line.

* * * * *